US012629610B2

(12) United States Patent (10) Patent No.: US 12,629,610 B2
Brewer et al. (45) Date of Patent: May 19, 2026

(54) AUTOMATED GROUP SEPARATIONS OF COMPLEX MIXTURES WITH GEL FILTRATION PIPETTE TIPS

(71) Applicant: DPX Technologies, LLC, Columbia, SC (US)

(72) Inventors: William E. Brewer, Columbia, SC (US); Matthew G. Fitts, Columbia, SC (US)

(73) Assignee: DPX TECHNOLOGIES, INC., Columbia, SC (US)

( * ) Notice: Subject to any disclaimer, the term of this patent is extended or adjusted under 35 U.S.C. 154(b) by 1068 days.

(21) Appl. No.: 17/684,631

(22) Filed: Mar. 2, 2022

(65) Prior Publication Data

US 2022/0184525 A1 Jun. 16, 2022

Related U.S. Application Data

(63) Continuation of application No. PCT/US2020/049039, filed on Sep. 2, 2020.

(60) Provisional application No. 62/895,038, filed on Sep. 3, 2019.

(51) Int. Cl.
| | |
|---|---|
| *B01D 11/04* | (2006.01) |
| *B01D 15/34* | (2006.01) |
| *B01L 3/02* | (2006.01) |
| *G01N 27/447* | (2006.01) |
| *G01N 30/60* | (2006.01) |

(Continued)

(52) U.S. Cl.
CPC .......... *B01D 11/0492* (2013.01); *B01L 3/021* (2013.01); *B01L 3/0275* (2013.01); *B01L 2300/0681* (2013.01); *B01L 2300/069* (2013.01)

(58) Field of Classification Search
None
See application file for complete search history.

(56) References Cited

U.S. PATENT DOCUMENTS

| 6,416,716 B1 | 7/2002 | Shukla |
|---|---|---|
| 9,114,383 B2 | 8/2015 | Gjerde et al. |
| 2009/0223893 A1 | 9/2009 | Gjerde et al. |

(Continued)

FOREIGN PATENT DOCUMENTS

| GB | 2439050 A | 12/2007 |
|---|---|---|
| WO | 2018026888 A2 | 3/2018 |

OTHER PUBLICATIONS

Supplementary European Search Report for Application No. 20860379.5.

(Continued)

*Primary Examiner* — Elizabeth A Robinson
*Assistant Examiner* — Brittany I Fisher
(74) *Attorney, Agent, or Firm* — Boulware & Valoir PLLC

(57) ABSTRACT

A device for automated or manual group separations of complex biological mixtures and methods of use are described. The device is a gel filtration pipette tip having a size exclusion media therein and held in place by a filter at the distal end of the pipette tip and an optional removable or pierceable barrier at the proximal end of the pipette tip. The size exclusion media is wetted by aspirating a solvent from the bottom of the pipette tip and equilibrating the solvent with the size exclusion media. The solvent is then allowed to gravity drain from the pipette tip, allowing the size exclusion media to settle and reproducibly pack into a homogenous gel. Gel filtration separations can then be performed with the gelled size exclusion media.

13 Claims, 4 Drawing Sheets

(51) Int. Cl.
    *G01N 30/74*      (2006.01)
    *G01N 35/10*      (2006.01)

(56)           References Cited

U.S. PATENT DOCUMENTS

| | | |
|---|---|---|
| 2010/0081209 A1 | 4/2010 | Brewer |
| 2011/0042317 A1 | 2/2011 | Gjerde et al. |

OTHER PUBLICATIONS

European Search Report for Application No. 20860379 dated Mar. 17, 2025.

FIGURE 2A
FIGURE 2C
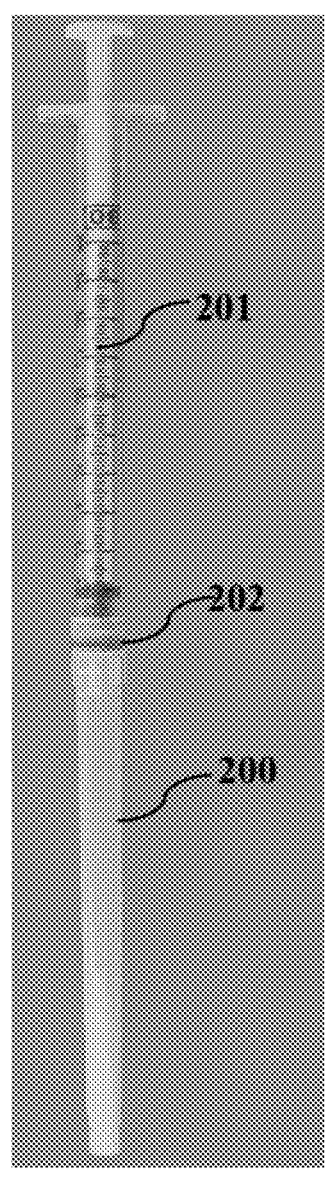
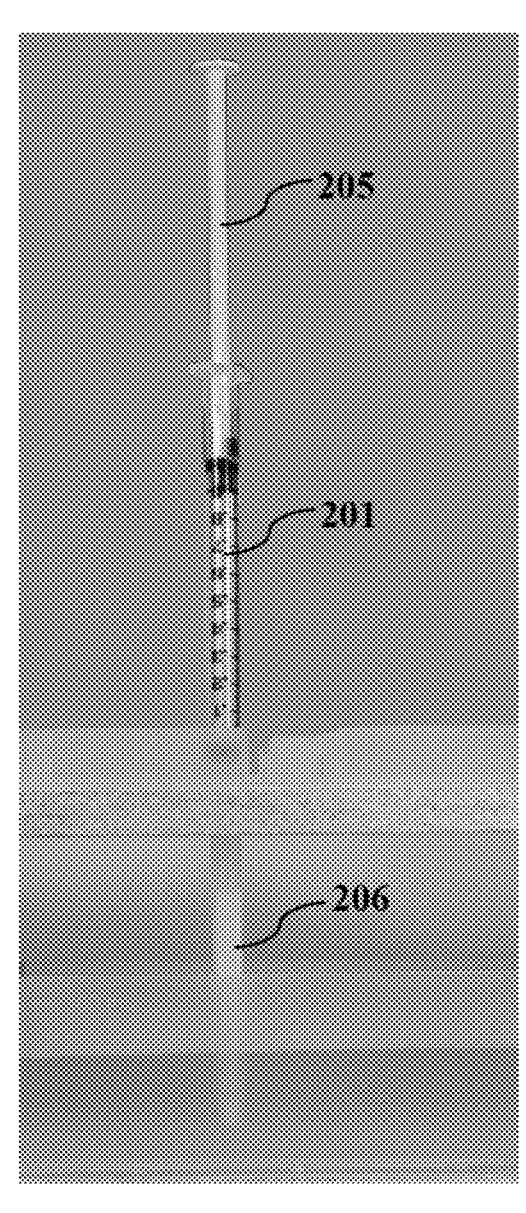

AUTOMATED GROUP SEPARATIONS OF COMPLEX MIXTURES WITH GEL FILTRATION PIPETTE TIPS

PRIOR RELATED APPLICATIONS

This application is a continuation of PCT/US20/49039 (WO2021046110), filed Sep. 2, 2020, which claims priority to U.S. Provisional Application No. 62/895,038, filed on Sep. 3, 2019, each of which is incorporated herein in its entirety for all purposes.

FEDERALLY SPONSORED RESEARCH STATEMENT

Not applicable.

REFERENCE TO MICROFICHE APPENDIX

Not applicable.

FIELD OF THE DISCLOSURE

The disclosure relates generally to the field of chemical and biological sample preparation. Specifically, devices and methods for separations of complex biological or chemical mixtures via automated gel filtration pipette tips are described.

BACKGROUND OF THE DISCLOSURE

Size-exclusion chromatography (SEC) is a chromatographic method in which molecules in solution are separated by their hydrodynamic volume and/or molecular weight using size exclusion media with varying porosities. This allows for excellent separation of large molecules from small molecules with a minimal volume of eluent, and the ability to use various solvents or buffers to affect the separation process. SEC can be separated into two different processes depending on the mobile phase: gel permeation chromatography and gel filtration chromatography.

Gel permeation chromatography (GPC) utilizes organic solvents as a mobile phase, making it useful for synthetic polymer separation. Polymer mixtures are separated by "size" (in this case, hydrodynamic volume) with the larger molecules eluting faster because they do not have access to the finer pores; smaller molecules are retained longer in these finer pores and elute later in the separation. Changes to the organic composition of the mobile phase can change the hydrodynamic volume of the polymer, allowing for the ability to improve separation of polymers with similar molecular weights.

Gel filtration chromatography utilizes an aqueous solvent as a mobile phase and is often applied to proteins, and other biomolecules such as polysaccharides and nucleic acids. Gel filtration chromatography has been well-established for group separations and high resolution fractionation of complex biomolecular mixtures. "Group separation" separates the components of a sample into two major groups according to size range, typically a high molecular weight fraction versus a low molecular weight fraction. Examples of group separations include desalting, buffer exchange and polymerase chain reaction (PCR) clean up. In contrast to group separations, high resolution fractionation separates the components of a sample according to differences in their molecular size. Thus, samples are separated into multiple components based on a certain molecular weight fractionation range.

For both group separations and high resolution fractionation, a variety of porous particles or resins having different porosities are commercially available to provide different molecular weight cut off values, depending on a laboratory's needs. However, the size exclusion media must first be swelled to form a slurry. In practice, the resins are first wetted with large amounts of an aqueous solvent, such as an aqueous buffer, for multiple hours or days. The wetted resin swells to provide specified pores, allowing for separation. As one example, the common resin Sephadex G-25 (GE Healthcare) must be wetted for at least 3 hours in an excess of buffer to swell the media using current methods of column.

To prepare size exclusion columns, the size exclusion media slurry is made to have a ratio of about 75% gel with about 25% buffer, before being degassed under vacuum. The degassed size exclusion media slurry is then transferred into a column with laborious steps to avoid bubbles and air pockets in the gel. After loading the slurry into the column, additional buffer is added to flow and equilibrate the column.

Due to the time consuming and laborious process of preparing a size exclusion column with inconsistent media packing, much focus has been on the automation of gel filtration preparation using robotic liquid handling (RLH) platforms. Unfortunately, automation of gel filtration methods has proven to be very difficult to achieve.

High resolution fractionation requires the sample volume to be approximately 2-4% of the gel bed volume. This results in a gel bed volume that is too large to be accommodated on most RLH platforms.

Group separations allow for a larger sample volume to be applied, typically 30% of the gel bed volume. Thus, the gel bed volumes can be smaller for group separations and an excellent fit for RLH. Micro-spin columns and plates have been developed for group separation reactions; however, the protocols for these devices require a centrifugation step.

Recently, pipette tips containing size exclusion media have become commercially available from PhyNexus (San Jose, CA) and IMCS (Irmo, SC). These pipette tips act as the column, and contain size exclusion media that is already swollen to a gel and equilibrated. However, there have been many problems associated with these products. For instance, the packed gel can be readily disrupted during shipping, resulting in air pockets and channeling issues. Furthermore, additional steps are often required to ensure the packing of the gel is adequate, such as centrifugation prior to use, or steps to remove solvents or other preservatives. The Phytips from PhyNexus and described in US20090223893, for example, utilize a solvent such as glycerol to maintain the wet bed of media and prevent adverse column function associated with a dried-out media. However, this requires the user to remove glycerol prior to use. These extra requirements are time consuming steps that have to be performed by a technician and not the RLH, and can also introduce contamination issues.

Thus, there still exists a need for improvements in the automation of gel filtration preparation and analysis to remove as many human-dependent steps as possible. Even minor improvements that reduce the time needed to gel the size exclusion media and sample separation steps without sacrificing homogeneity of the gel will greatly improve laboratory throughput and success in separations.

SUMMARY OF THE DISCLOSURE

Disclosed herein is a novel device for automated or manual gel filtration separations, including group separations and high resolution fractionation, of complex biological mixtures, and methods using the novel device. Specifically, the device is a pipette tip with a filter at the narrow, distal end of the pipette tip, and a dry size exclusion media loosely contained inside the pipette tip. Methods of preparing the device for gel filtration chromatography and methods of using the novel device are also described.

In more detail, the novel device and methods described herein use a standard or robotic pipette tip as a gel filtration pipette tip, sometimes referred to herein as a filtration pipette tip when the resin is dry. The gel filtration pipette tip is fitted with at least one filter at the distal (bottom) narrow end, wherein the filter allows for the placement of a dry size exclusion media or resin in the pipette tip, above the filter. Any resin used for gel filtration chromatography can be used in the pipette tip, including agarose- or sepharose-based resins, polyacrylamide, dextran, polystyrene, polyacrylate, cellulose, and other hydrophilic polymer materials. The gel filtration pipette tip may also have an optional removable or pierceable barrier or cap at the proximal (top) wide end of the pipette tip to seal the tip and contain the dry media.

To gel the dry size exclusion media for size exclusion chromatography, a solvent is aspirated, using a pipetting aid, into the gel filtration pipette tip, from the bottom, for maximum contact between the solvent and the dry media. After equilibration, the solvent is then allowed to gravity drain through the pipette, resulting in a swelled, homogeneous gel. This allows for reproducible packing of the size exclusion media. Alternatively, positive pressure from a syringe, a hand-held pipettor or by the robotic liquid handler can be used to push the solvent out of the gel filtration pipette tip. Once the homogeneous gel has formed in the pipette tip, samples can be loaded onto the top of the gel and analytes can be separate by a gel filtration process inside the pipette tip.

There are many advantages of using this bottom loading and swelling of the size exclusion media. The method results in a much faster ability to form a homogenous gel than methods utilizing conventional top loading of buffer or solvents. Instead of requiring large volumes of solvent and hours (or days) for swelling, the size exclusion gel is ready in minutes using this bottom loading method in a pipette tip. Further, the gel is reproducibly made without air pockets, which destroys the separating abilities of the gel. This method allows for reproducible packing of the gel without concerns of air pockets or channeling. By loading the buffer or solvent from the distal narrow end of the pipette tip, the media particles float at first, then absorb the solvent, and subsequently begin to settle to the bottom of the pipette tip to the filter. This avoids the creation of air bubbles in the gel, as the buffer displaces air and prevents trapped air from forming.

The device uses a standard or robotic pipette tip, which mean the hub of the device (opposite the narrow, distal end) will fit directly over the barrel of most pipetting aids, including robotic liquid handlers, syringes, and/or pipettors, allowing the pipetting aids to be used to aspirate the solvent into the device.

In some embodiments, the novel device can include a syringe attached to the proximal end (hub) of the pipette tip, wherein the syringe forms an air-tight seal with the inside of the pipette tip. The syringe can have a filter at its distal end, above the attachment to the pipette tip, to prevent resin from entering the syringe.

An adaptor or other means can be used to indirectly attach the gel filtration pipette tip to the pipetting aid. As an example, an adaptor that can be fitted to the hub of the gel filtration pipette tip on one end, and fitted to the barrel of a robotic liquid handler on the other end, can be used to create physical space between the gel filtration pipette tip and the pipetting head of a robotic liquid handler to prevent cross contamination of samples without sacrificing the abilities of the robotic liquid handler. Alternatively, a Tip-on-Tip (ToT) format such as that described in WO20180268886, wherein the gel filtration pipette tip is the 'bottom' tip can be used. In this format, a 'top' pipette tip forms an air-tight seal at the hub of the 'bottom' gel filtration pipette tip, and the pipetting aid is attached to the 'top' tip, allowing for an indirect attachment of the pipetting aid to the gel filtration pipette tip.

Once the homogenous gel is formed in the novel device, a sample solution can be added to the top of the gel to load the gel, and the gel filtration separation process can commence. Alternatively, the tip can be stored for later use by placing its distal end in a reservoir of buffer to prevent drying. The storage container may be a screw cap vial, or a rack with a lid that contains buffer in the bottom reservoir.

The gelation process and separation process can be performed using any pipetting aid, including hand-held pipettor, a syringe, or a robotic liquid handler. Because the gelation process for the gel filtration pipette tip can be performed using a RLH platform, the entire process, from gelation to separation to analysis can be performed by the robot. This leads to higher throughput, while minimizing the user's time and sample interaction.

The present devices and methods include any of the following embodiments in any combination(s) of one or more thereof:

A device for extraction and filtration comprising a pipette tip having a filter located at a distal delivery end and a dry size exclusion media in the pipette tip, above the filter and below a hub located at a proximal end of the pipette tip. The pipette tip can have an optional barrier located at the hub of the pipette tip to help retain the dry size exclusion media during transport, storage, and/or handling. The optional barrier is removed (e.g. cap) or pierced (e.g. foil) before use.

The device can further include a syringe removably attached to the hub of the pipette tip and forming an air-tight seal with the inside surface of the hub, wherein the syringe has a frit at the distal end of the syringe above the point of contact for the air-tight seal.

The device can further include an adaptor removably attached to the hub of the pipette tip and forming an air-tight seal with the inside surface of the hub, wherein the adaptor is sized to friction fit onto a barrel of the pipette head on a robotic liquid handler. Like the syringe, this adaptor may also have a frit located therein.

Any of the above devices, wherein the filter is a screen or porous frit.

Any of the above devices, wherein the filter is stainless steel, porous polymeric material, porous glass, or porous ceramic.

Any of the above devices, wherein the dry size exclusion media is agarose, sepharose, polyacrylamide, dextran, polystyrene, polyacrylate, cellulose, or a combination thereof.

Any of the above devices, wherein the dry size exclusion media comprises dextran crosslinked with epichlorohydrin.

Any of the above devices, wherein the amount of the dry size exclusion media is between about 10 mg and about 500 mg. Alternatively, the amount of the dry size exclusion media is between about 140 mg and about 180 mg.

Any of the above devices, wherein the average particle diameter of the dry size exclusion media is between about 10

μm and about 500 μm. Alternatively, the amount of the dry size exclusion media is between about 100 μm and about 300 μm.

Any of the above devices, wherein the molecular weight cutoff of the dry size exclusion media is between about 1000 Da to about 100,000.

Any of the above devices, wherein the dry size exclusion media is loosely contained in the pipette tip.

Any of the above devices, wherein the optional barrier is foil, film, membranes, tape, silicon rubber, soft rubber, or neoprene. Alternatively, the barrier can be a cap or lid, e.g., a friction fit cap.

Any of the above devices, wherein the optional barrier is removable or pierceable. The barrier can be removed or pierced prior to aspirating the buffer to form the gel, or just prior to loading sample onto the gel.

A method of preparing a gel filtration pipette tip comprising attaching any of the above described devices to a pipetting aid, aspirating a solvent through the distal delivery end of the pipette tip using a pipetting aid, equilibrating the dry size exclusion media and the solvent to form a wetted size exclusion media, and draining the excess solvent through the distal delivery end. The draining step can utilize gravity flow, which occurs when the pipette aid is removed from the pipette tip, thus breaking the vacuum, or positive pressure from the pipetting aid to drain the excess solvent. Further, during the draining step, the wetted size exclusion media settles and forms a gel filtration pipette tip with a homogenous gel filtration column.

A method of gel filtration comprising attaching any of the above described devices to a pipetting aid, aspirating a solvent through the distal delivery end of the pipette tip using a pipetting aid, equilibrating the dry size exclusion media and the solvent to form a wetted size exclusion media, and draining the excess solvent through the distal delivery end to form a gel filtration pipette tip with a homogenous gel filtration column. Once the homogenous gel filtration column is formed, a sample solution is introduced above the homogenous gel, wherein the sample solution comprises two or more analytes that are different sizes; loading the sample solution into the gel filtration column by flowing, via gravity or positive pressure, the sample into the gel; adding an elution solvent to the top of the loaded homogenous gel; flowing the elution solvent through the loaded homogenous gel filtration column, wherein the homogenous gel filtration column separates the two or more analytes into two or more groups based on the size of the analytes; and, eluting the separated two or more groups into their own collection well.

A method of gel filtration comprising attaching any of the above described devices to a pipetting aid, aspirating a solvent through the distal delivery end of the pipette tip, equilibrating the dry size exclusion media and the solvent to form a wetted size exclusion media, and draining the excess solvent through the distal delivery end to form a gel filtration pipette tip with a homogenous gel filtration column. Once the homogenous gel filtration column is formed, a sample solution is introduced to the top of the homogenous gel to load the homogenous gel with the sample solution, wherein the sample solution is two or more analytes that are different sizes. An elution solvent is then added to the top of homogenous gel in the gel filtration pipette tip and is allowed to flow through the loaded homogenous gel filtration column, wherein the step of adding the elution solvent is repeated 2 to 5 times. The homogenous gel filtration column separates the two or more analytes into two or more groups based on the size of the analytes. Finally, the separated two or more groups are eluted into their own collection well.

A method of gel filtration comprising attaching any of the above described devices to a pipetting aid, aspirating a solvent through the distal delivery end of a pipette tip, equilibrating the dry size exclusion media and the solvent to form a wetted size exclusion media, and draining the excess solvent through the distal delivery end to form a gel filtration pipette tip with a homogenous gel filtration column. Once the homogenous gel filtration column is formed, a sample solution is introduced to the top of the homogenous gel to load the homogenous gel with the sample solution, wherein the sample solution is two or more analytes that are different sizes. A top pipette tip having the elution solvent is then inserted into hub or proximal end of the gel filtration pipette tip to form an air-tight seal between the inner surface of the gel filtration pipette tip and the outer surface of a top pipette tip. The elution solvent flows to the top of the loaded homogenous gel filtration column, and is allowed to flow through the loaded homogenous gel, wherein the homogenous gel filtration column separates the two or more analytes into two or more groups based on the size of the analytes; and, thereby eluting the two or more separated groups into their own collection well.

Any of the above methods, wherein the pipetting aid is attached directly to the device, or attached indirectly to the device through the use of an adaptor or top pipette tip.

Any of the above methods, wherein the pipetting aid is a hand-held pipettor, a syringe, or a robotic liquid handler that directly attaches to the filtration pipette tip or indirectly attaches thereto through the use of an adaptor or top pipette tip.

Any of the above methods, wherein the solvent and/or elution solvent is aqueous.

Any of the above methods, wherein the solvent and/or elution solvent is a buffer having a pH between about 3 and 12.

Any of the above methods, wherein the solvent and/or elution solvent is phosphate buffered saline.

Any of the above methods, wherein the adding an elution solvent step is repeated 2-5 times.

Any of the above methods, wherein all steps in the method are performed by a robotic liquid handling platform.

Any of the above methods, wherein all steps in the method are performed using a handheld pipettor or a syringe attached to the gel filtration pipette tip.

Any of the above methods, wherein the aspirating, equilibrating, introducing, and adding steps are performed by a robotic liquid handling platform.

Any of the above methods, wherein the aspirating, equilibrating, introducing, and adding steps are performed using a handheld pipettor or a syringe attached to the gel filtration pipette tip device.

Any of the above methods, using the robotic liquid handling platform, wherein the robotic liquid handler picks up and moves the Tip-on-Tip device having the top pipette tip and the gel filtration pipette tip. In some embodiments, the robotic liquid handler moves the Tip-on-Tip device from a rack above a waste reservoir to a rack above one or more collection wells.

Any of the above methods, wherein the equilibrating step is between 1 and 15 minutes long or 10 minutes long.

Any of the above methods, wherein the draining step comprises gravity flow or positive pressure.

Any of the above methods, wherein the flowing step comprises gravity flow or positive pressure.

Any of the above methods, wherein the loading step comprises gravity flow or positive pressure.

Any of the above methods, further comprising the step of analyzing the separated analytes using refractive index detector, UV-Vis detector, viscometer, multi-angle light scattering detector, gel electrophoresis and/or mass spectrometer.

A kit comprising one or more gel filtration pipette tips as described herein, one or more storage containers, and a syringe that can be attached or detached to each pipette tip for aspirating and dispensing fluids through the one or more gel filtration pipette tips.

A kit comprising one or more gel filtration pipette tips as described herein, one or more storage containers, and an adaptor that can be attached or detached to the hub of each pipette tip and forming an air-tight seal with the inside surface of the hub, wherein the adaptor is sized to friction fit onto a barrel of the pipette head on a robotic liquid handler.

While multiple embodiments are disclosed, still other embodiments will become apparent to those skilled in the art from the following detailed description. As will be apparent, certain embodiments, as disclosed herein, are capable of modifications in various aspects, without departing from the spirit and scope of the claims as presented herein. Accordingly, the drawings and detailed description are to be regarded as illustrative in nature and not restrictive.

The term "pipette tip" is a term of art, and refers to a conical tube with a proximal larger end, called the "hub" herein, and a distal narrow end, called the "delivery end" herein, which is precisely engineered for accurate sampling and delivery of fluids. The hub fits over the barrel of the pipetting aid (e.g. manual hand-held pipettor, syringe, or robotic liquid handler), typically by friction fit. The interior diameter of the tip hub must be slightly larger than the barrel of the pipetting aid and the inside taper of the tip must also match the taper of the pipetting aid's barrel. Most manufacturers of hand-held pipettors and robotic liquid handler systems make pipettors that will utilize universal pipette tips.

The pipette tip fits onto the barrel of the pipetting aids in an air-tight manner, such that when the plunger of most pipetting aids is pressed and released, a vacuum is applied, and fluid is pulled into the pipette tip. That fluid can be delivered to any receptacle as needed by again pressing the plunger. Some pipette tips are sealed to the barrel of the pipettors through the use of gaskets rather than the taper of the pipette tip. Some robotic pipette tips are not friction fitted, but use an expandable o-ring to make the air-tight seal required for liquid pipetting. As such, pipette tips are available in a range of sizes to fit different pipetting aids.

Similarly, pipette tips also fit onto the adaptor end of syringes and can form an air-tight seal through the use of a gasket or o-ring on the syringe. For a syringe, fluid is pulled into the pipette tip by pulling the syringe's plunger outward away from the syringe's body, and fluid is delivered by pushing the plunger inward into the syringe's body.

Preferably, the pipette tip has one or more ridges on an outer surface near the hub, such that the ridge(s) allows the tip to be stored on a platform having an array of holes, the ridges preventing the conical tip from sinking too far into the hole and risk getting stuck. Such ridges are common on pipette tips. Common ridge styles include an annular ridge that completely circumnavigates the pipette tip, and a plurality of vertical fins, which provide strength, support the tip on the hole, and also minimize materials and weight. Combinations are also common. In some embodiments, the ridges are used to store the pipette tip on the neck of the housing.

The term "robotic pipette tip" is a pipette tip whose inner taper in the hub is such as to fit a robotic liquid handler. Most frequently there is no difference between a robotic pipette tip and a pipette tip for a hand-held pipettor, but there can be size differences.

The term "pipetting aid" as used herein refers to the various apparatus that are used to control fluid flow in and out of pipette tips, often by creating a vacuum. This includes hand-held or manual pipettors, pipettors (pipetting heads) on robotic liquid handler, and syringes, which directly attach to the hub of the pipette tip to form an air-tight seal, as well as adaptors or other means to indirectly attach the apparatus to the hub of the pipette tips. For example, WO2018026886 describes a tip-on-tip (ToT) format, wherein a "top" pipette tip performs some sample preparation steps before being attached, either reversibly or irreversibly, by fitting inside a second "bottom" pipette tip and forming an air-tight seal. The bottom tip has been modified to include a screen or frit, such that once attached, the sample solution is eluted from the top tip through the bottom pipette tip, which filters and cleans the solution. In the presently described methods, a top tip can be directly attached to the 'bottom' gel filtration pipette tip, and the robotic liquid handler will then be attached directly to the top tip, and indirectly attached to the gel filtration pipette tip. As used herein, the term "top pipette tip" refers to a pipette tip having an o-ring or gasket on its outer surface for engaging with the inner surface of the hub of another pipette tip, wherein an air-tight seal forms between the two tips via the o-ring or gasket. In the present methods, a top pipette tip can be attached to a gel filtration pipette tip for forming a Tip-on-Tip format.

Alternatively, robotic liquid handlers may have adaptors that create distance between the pipetting head and the tip to reduce sample cross contamination on the pipetting head, or to aid in picking up and moving pipette tips around the RLH platform. In the presently described methods, the adaptor can be directly attached to the robotic liquid handler, and capable of engaging the hub of the gel filtration pipette tip such that the RLH is indirectly attached to the gel filtration pipette tip.

A "robotic liquid handler" is a robotic system, used for automation in chemical or biochemical laboratories that dispenses a selected quantity of reagent, samples or other liquid to a designated container. The simplest version can dispense an allotted volume of liquid from a motorized pipettor (pipetting head) or syringe; more complicated systems can also manipulate the position of the dispensers and containers (often a Cartesian coordinate robot) and/or integrate additional laboratory devices or add-ons, such as microplate readers, heat sealers, heater/shakers, bar code readers, spectrophotometric or separation devices and instruments, storage devices, waste containers and incubators. In addition to the motorized pipettor or syringe, robotic liquid handlers can also be a part of a robotic liquid handling platform that also have trays for sample wells or trays for holding sample vials, trays of pipette tips that fit the pipettor, and containers of solvents.

The methods described herein require a robotic liquid handler capable of manipulating the position of pipette tips on the Cartesian, 3-axis movements, typically implemented by means of an arm, and having multi-pipetting capabilities. To further reduce human interaction, it is also desirable to have spectrophotometric instruments or mass spectrometers integrated with the handler.

Exemplary robotic liquid handlers include the Star or Starlet, Microlab VANTAGE or Nimbus from Hamilton Company; Bravo Automated Liquid Handling Platform from Agilent; the epMotion from Eppendorf; the Biomek 4000 or NX or FX from Beckman Coulter; the PIPETMAN from Gilson; the Freedom Evo from Tecan; and PAL systems from CTC or the MPS from GERSTEL, which are capable of being modified to perform pipetting and integrated with a variety of separation-mass spectrometric instruments. However, any commercially available robotic liquid handler can be used and/or modified to perform the disclosed separations.

As used herein, the term "membrane" refers to a thin pliable film that acts as a barrier. In this application, the membrane will protect and contain the dry size exclusion media within the pipette tip during storage and transport. The membrane can be placed on the pipette tip during manufacturing using means known in the art.

The terms "resin" and "size exclusion media" are used interchangeably to refer to gel filtration media. The gel filtration media can be dry and in the form of particles or beads during storage or transportation. The gel filtration media can also be water- or buffer-swollen to form a gel matrix having pores either larger or smaller than the analyte.

As used herein, the term "target compounds" refers to the compounds that are being separated using the gel filtration media. In some embodiments, the target compounds can include biomolecules, particularly biological macromolecules such as proteins and peptides, polynucleotides such as DNA and RNA, lipids, and polysaccharides.

As used herein, "air-tight" is used to describe the seal between the pipettor head (or an adaptor attached thereto) and the hub of the pipette tip and/or the seal between the inner surface of the gel filtration pipette tip and the outer surface of a top pipette tip or syringe head, and simply means that no gases (e.g. air) passes at this point of contact. The flow of gas is relegated to the opening of the pipette tip(s).

As used herein, the term "gasket" refers to a shaped piece of soft material used for sealing the junction between two surfaces. The gasket fills the space between two or more mating surfaces. Gaskets are normally made from rubber, silicone, metal, cork, neoprene, nitrile rubber, fiberglass, polytetrafluoroethylene (otherwise known as PTFE or Teflon), a plastic polymer (such as polychlorotrifluoroethylene) and other material that has some degree of yielding to allow for the deformation needed to fill the space between the two surfaces.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| GPC | Gel permeation chromatography |
| PBS | phosphate buffered saline |
| PCR | polymerase chain reaction |
| RLH | robotic liquid handling |
| SEC | Size-exclusion chromatography |
| ToT | Tip-on-Tip format |

BRIEF DESCRIPTION OF THE DRAWINGS

FIGS. 2A-C display an embodiment of a gel filtration pipette tip attached to a syringe instead of a pipettor or RLH (2A), and resting on a rack (2B) in a solvent reservoir.

FIG. 2C displays the syringe and gel filtration pipette tip resting on a rack while the resin interacts with the solvent and swells.

DESCRIPTION OF EMBODIMENTS OF THE DISCLOSURE

Figure 1A:
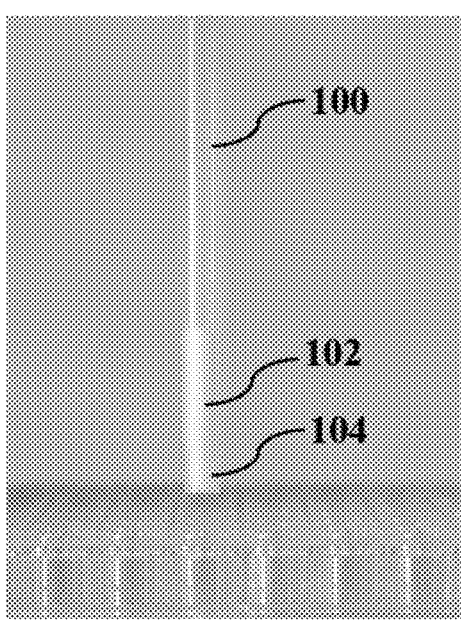
FIGS. 1A-B display a gel filtration pipette tip having 180 mg of Sephadex G15 resin before swelling (1A) and after swelling (1B).

The invention provides a novel device for gel filtration chromatography that is a pipette tip having a distal filter (or frit) and dry, pre-gelled filtration resin above the filter (or frit), and methods for automating the preparation of the gel in the pipette tip. Thus, gel filtration separations, both group separations and high resolution fractionation, with the novel device, referred to herein as "gel filtration pipette tips", can be automated using robotic liquid handlers, or manually performed using hand-held pipettors or syringes. The present device and methods of preparing the gel were developed to overcome the complexities and time commitment of manual gel filtration column preparation and centrifugation steps. The present methods remove the need for extra centrifugation steps or positive pressure manifolds, thus minimizing the user's time and sample interaction.

The novel device and methods described herein use a standard or robotic pipette tip as a "gel filtration pipette tip". The gel filtration pipette tip is fitted with at least one frit or filter at the distal (bottom) narrow end. The filter allows for the placement of a dry size exclusion media in the pipette tip, above the filter. The filter in the pipette tip can be any screen or frit known in the art, such as stainless steel, porous polymeric material, porous glass, porous ceramic, or other similar materials. In some embodiments, a porous plastic material that can be modified to include varying amounts of porosity is used, where the pores are larger at the top end and smaller at the narrow end of the filter to prevent clogging. Alternatively, a series of stacked frits of varying porosities can be used to form the filter. Regardless of the numbers of filters used, the pores in the screen(s) and/or frit(s) are sized to be smaller in diameter than the dry size exclusion media powder particles.

The size exclusion media can be any resin known in the art for gel filtration chromatography, such as agarose- or sepharose-based resins, polyacrylamide, dextran (e.g. dextran crosslinked with epichlorohydrin), polystyrene, polyacrylate, cellulose, and other hydrophilic polymer materials.

Commercially available size exclusion media include the Superdex, Sephacryl, or Superose series of resins from GE Healthcare (Pittsburgh, PA): GE Sephadex S-200, GE Sephadex S-300, ToyoPearl HW-55F, and GE Superose 12 Prep. In some embodiments, soft gel resin particles, such as agarose- and sepharose-based beads, are preferred.

The size exclusion media can have any molecular weight cutoff that is normally used in gel filtration chromatography, but is preferably in the range of 1000 Da to over 100,000 Da. In some embodiments, the chosen size exclusion media has a molecular weight cutoff range between 1000 Da and 10,000 Da, or between 50,000 Da and 100,000 Da, or between 20,000 Da and 70,000 Da. Alternatively, the molecular weight cutoff can be 1000 Da, 1500 Da, 2500 Da, 5,000 Da, 10,000 Da, 20,000 Da, 50,000 Da, 70,000 Da, or 100,000 Da.

The average particle diameters of the dry size exclusion media beads used in the present device and methods are typically in the range of about 1 μm up to one millimeter, e.g., diameters in ranges having lower limits of 10 μm, 20 μm, 30 μm, 40 μm, 50 μm, 60 μm, 70 μm, 80 μm, 90 μm, 100 μm, 150 μm, 200 μm, 300 μm, or 500 μm, and upper limits of 50 μm, 60 μm, 70 μm, 80 μm, 90 μm, 100 μm, 150 μm, 200 μm, 300 μm, 500 μm.

The amount of dry size exclusion media resin in the gel filtration pipette tip can be between about 10 mg and about 500 mg of size exclusion media, preferably in the range of about 100 to about 200 mg, and most preferably between about 140 and 180 mg. Alternatively, the amount of dry size exclusion media resin in the gel filtration pipette tip can be about a fourth to a third of the volume of the pipette tip.

The dry size exclusion media is loosely contained in the gel filtration pipette tip, above the filter but below the hub. Alternatively, the dry size exclusion media is held in place between the filter and a pierceable barrier or removable barrier, located at or below the hub (proximal end that attaches to the pipettor) of the gel filtration pipette tip. The barrier serves as a means to seal the gel filtration pipette tip and securely contain the dry media resin during e.g. transportation and handling.

The pierceable barrier can be any known in the art including pierceable foil, film, membranes or tape. In some embodiments, the material may be silicon rubber, soft rubber, neoprene, other suitable pierceable material(s), or a combination thereof. This allows the barrier to be pierced by an e.g. pipette tip or other means to break the seal before use. In other embodiments, the barrier is removable by hand prior to use. In some embodiments, a user can remove each barrier as needed or can remove the barrier for a e.g. 96-piece tray of gel filtration pipette tips at once.

Because this novel device utilizes loosely contained and dry size exclusion media, it can be stored for longer periods of time before being used compared to devices that utilizes wet packed beds of media. While the devices with wet packed beds of media may dry out or have channels, air bubbles and air pockets formed over time, or even formed during shipment of the products, the dry resin in the present devices are shelf stable and storage will not affect their ability to be gelled at a later time.

The basic method of preparing a gel in the gel filtration pipette tip for size exclusion chromatography includes the steps of:

1) engaging the gel filtration pipette tip with a pipetting aid such as a hand-held pipettor, syringe, or automated liquid handler;

2) aspirating solvent (e.g. buffer) into the gel filtration pipette tip and waiting a predetermined amount of time to allow the resin to swell;

3) detaching the pipette tip from the pipetting aid; and, 4) allowing the solvent (e.g. buffer) to flow via gravity through the gel filtration pipette tip into a collection container or reservoir, and thus producing a homogeneous gel 'column'. In some embodiments of the present methods, the pipetting aid is used to apply positive pressure to push the solvent through the gel filtration pipette tip.

Figure 1B:
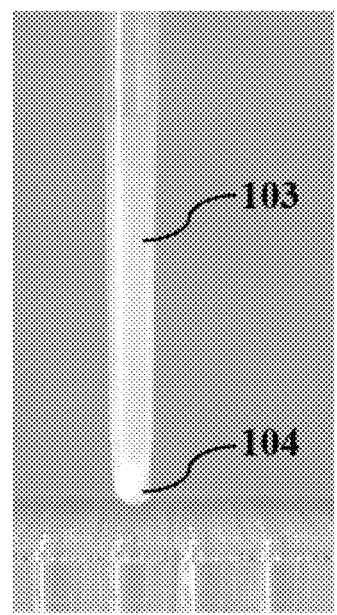

FIG. 1A displays a gel filtration pipette tip 100 with dry size exclusion media resin 102 loosely contained therein, and FIG. 1B displays the same gel filtration pipette tip 100 after the size exclusion media gel 103 has been prepared. A filter 104 located at the distal narrow end prevents loss of the size exclusion media 102 or gel 103.

The gel filtration pipette tip 100 shown in FIG. 1A has about 180 mg of dry size exclusion media resin 102 called Sephadex G15. A 0.7 mL aliquot of a phosphate buffered saline (PBS) solution was then aspirated through the dry Sephadex G15 resin using a pipetting aid (not shown). The resin was allowed to interact with the PBS solution for about 10 minutes before the pipetting aid was detached, allowing the PBS to exit the gel filtration pipette tips via gravity flow. The resulting homogeneous gel column shown in FIG. 1B is about 4.5 cm in length and can be used with sample volumes up to 200 to 300 μL.

This gel preparation process and method of use are explained in more detail below.

To prepare the dry size exclusion media for gel filtration, a solvent is aspirated, or pulled, through the bottom of the gel filtration pipette tip through the size exclusion media using a pipetting aid (not shown) that is directly or indirectly attached to the gel filtration pipette tip.

The amount of solvent needed depends on the size of the pipette tip, with the preferable amount of solvent being about 60 to 80% of the maximal volume of the pipette tip, not the listed volume. For example, a 1 mL pipette tip may have a maximal volume of about 1.2 mL, so the amount of solvent would be between about 0.6 and 0.9 mL. For 300 μL tips, which have a maximal volume of about 350 μL, this will be about 200 μL to 300 μL of solvent.

Any solvent normally used for gel filtration can be used to wet the size exclusion media. In some embodiments, the solvent is aqueous based. The solvent, in some embodiments, is a buffer having a pH between 3 and 12, such as phosphate buffered saline. Various buffers can be used, with selection being dependent on the analytes being analyzed.

This solvent is held in the gel filtration pipette tip and allowed to interact and equilibrate with the size exclusion media to promote in-tip resin swelling for a predetermined period of time. The solvent is able to be held within the gel filtration pipette tip, without leakage from the narrow end of the gel filtration pipette tip, due to the vacuum created by the air-tight seal(s) between the pipetting aid and the gel filtration pipette tip.

The predetermined period of time for swelling/equilibration is between about 1 and about 20 minutes; alternatively, the predetermined period of time is between about 1 to 15 minutes; alternatively, the predetermined period of time is between about 5 to 12 minutes; alternatively, the predetermined period of time is about 10 minutes. Initially, the size exclusion media tends to float in the solvent before absorbing the solvent. As the size exclusion media begins to swell and equilibrate, the particles settle towards the distal end of the pipette tip, above the filter.

After the predetermined time has passed, the vacuum is broken by detaching the pipetting means from the gel filtration pipette tip. This allows the excess solvent to drain from the gel filtration pipette tip, via gravity flow, into a waste container or collection vessel. Alternatively, positive pressure from the manual or automated pipettor can be used to push the solvent out of the gel filtration pipette tip to speed up the preparation process.

As the solvent exits the pipette tip, the swelled size exclusion media packs efficiently, and reproducibly, into a homogeneous gel filtration column. This results in a homogenous gel in the gel filtration pipette tip, and a gel filtration pipette tip that is ready for sample loading in less than about 15 minutes.

Figure 2B:
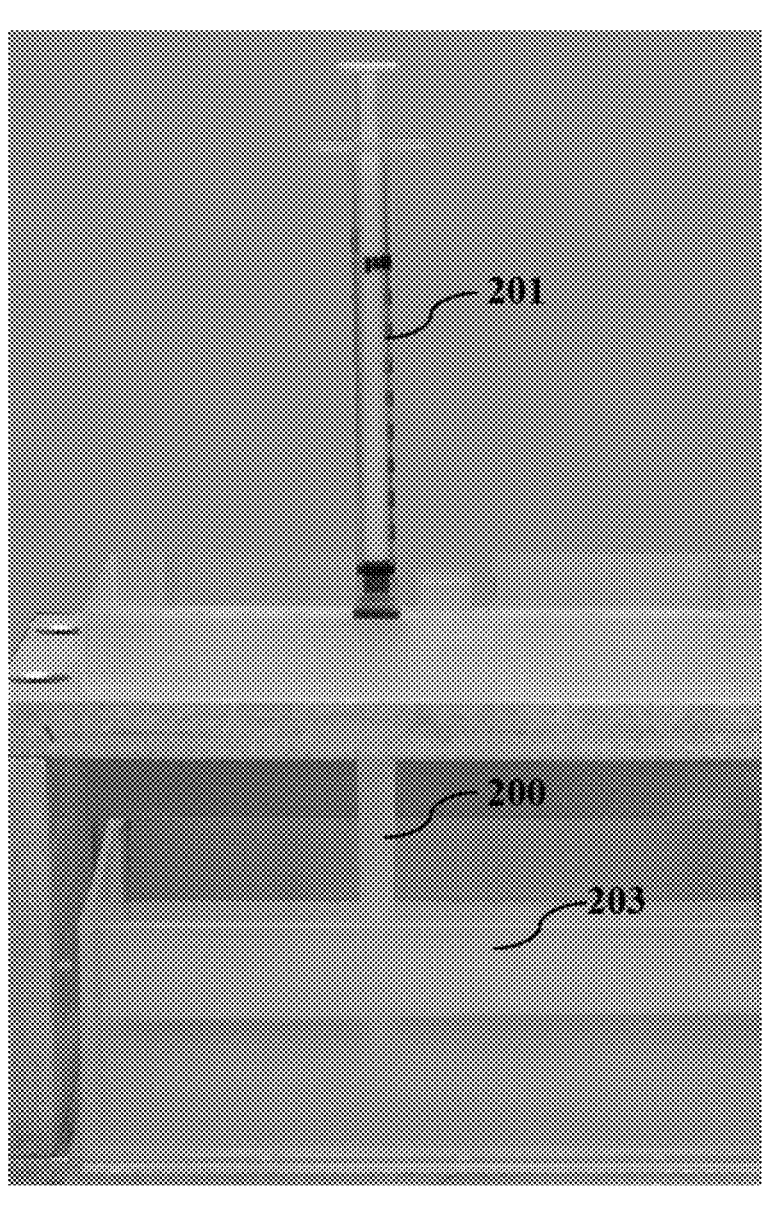

To give the solvent and size exclusion media time to interact and swell, the gel filtration pipette tip has to be connected to a pipettor to maintain the needed vacuum. While an RLH can be programmed to hold the gel filtration pipette tip during this waiting period, it can be difficult to keep a manual pipettor attached. As such, a syringe can be used in lieu of manual pipettor in some embodiments. FIG. 2A displays a disposable 1 mL syringe 201 that makes an air-tight seal with the gel filtration pipette tip 200 via a gasket 202. The gel filtration pipette tip 200 with resin inside can be placed into a solvent reservoir 203, as shown in FIG. 2B, and aspirate the required volume, then let the syringe/tip stand on a rack for a predetermined amount of time. FIG. 2C shows the syringe 201 with its plunger 205 pulled outward from the syringe body, and the resin and solvent interacting 206. Afterward the predetermined time ends, the syringe 201 can be detached from the gel filtration pipette tip 200, allowing gravity flow of the solvent out of the tip. Alternatively, the syringe can be used to add positive pressure to the gel filtration pipette tip to push the solvent out of the tip to speed up the gel preparation process.

The tip is then ready for sample loading once the solvent is drained.

A benefit of this "bottom loading" of the solvent and in-tip swelling is that it prepares a gel in a rapid, robust, and reproducible manner. This method also produces a homogenous gel without any air bubbles, air pockets or channeling. This avoids the issues experienced with the "top loading" of columns, such as the formation of bubbles in the gel and poor packing of the swollen resin particles. In addition, the design of the gel filtration pipette tip allows for reversible positive or negative pressure to be applied by the robotic liquid handling system, thereby eliminating the need for centrifugation.

Sample loading can be performed by adding the sample onto the top of the gel in the gel filtration pipette tip. This step can be performed using both manual and robotic pipetting techniques, including using the Tip-on-Tip format described in WO20180268886.

The volume of sample loading is dependent on the dead volume of the gel 'column' inside the pipette tip. As shown in FIG. 1B, the 'column' of homogenous gel formed in the gel filtration pipette tip is about 4.5 cm; however, it can be larger or smaller depending on the initial amount of dry size exclusion media resin and the size of the pipette tip being used. In some embodiments, the volume of sample loading will range between about 10 μL to about 500 μL, preferably in the range of 50 μL to 300 μL, or the range of 50 μL to 150 μL, or the range of 200 μL to 300 μL, or the range of 200 μL to 250 μL.

Once the sample is loaded onto the gel, an elution solvent can be added to the top of the gel and pushed through such that the target compounds in the sample solution interact with the gel, separating by size. The step of adding an elution solvent can be performed one time or can be repeated 2 to 5 times, depending on the amount of elution solvent that is desired. As each target compound is eluted from the bottom of the gel filtration pipette tip, it can be collected in one or more sample wells for further analysis.

The elution solvent can be pushed through the gel using positive pressure from the e.g. robotic liquid handler or pipettor. Alternatively, the elution solvent can be allowed to drain from the gel filtration pipette tip unaided, using gravity flow.

In many of the above steps, the pipetting aid is attached directly to the hub of the gel filtration pipette tip. However, it is also possible for the pipettor (manual or automated) or syringe to use adaptors or other means to indirectly engage the gel filtration pipette tip, e.g. the pipettor is directly attached to an adaptor and the adaptor is directly attached to the filtration pipette tip. Such an indirect attachment may be preferred to limit contamination of the pipettor/pipetting head, and any resulting cross-contamination between samples.

In some embodiments utilizing a RLH platform, a pipette tip used to transfer the elution solvent to the gel filtration pipette tip can be irreversibly or reversibly engaged with the gel filtration pipette tip in a Tip-on-Tip (ToT) format, forming an air-tight seal between the inner surface of the gel filtration pipette tip and the outer surface of the top pipette tip or between a gasket or o-ring on the outer surface of the top pipette tip. This format will allow for both tips to be moved together as one by the RLH arm. Such a format will be helpful for a fully automated process because it allows the gel filtration pipette tip (as part of a Tip-on-Tip format) to be moved from one rack atop a waste collection reservoir to another rack that is positioned above sample vials or wells without the pipetting head on the handler coming into contact with the gel filtration pipette tip after the sample is loaded, which can cause cross-contamination. Of course, it is also possible to use a regular pipette tip to add the elution solvent, then attach the top pipette tip to form the ToT before moving both tips. This ToT format eliminates cross-contamination issues for the robotic head as the robotic liquid handler will never engage the gel filtration pipette tip after the sample is added onto the gel. The Tip-on-Tip format can be used in other steps as well, such as the use of a reversible ToT format when adding solvent to the dry resin or adding positive pressure to push solvent or elution solvent from the gel filtration pipette tips. Alternatively, an adaptor on the pipetting head of the RLH can be used to engage the gel filtration pipette tip, allowing it to be moved from one rack atop a waste collection reservoir to another rack that is positioned above sample vials or wells without the pipetting head coming into contact with the gel filtration pipette tip after the sample is loaded.

For the elution step using a RLH, it is also possible to move the plates/collection reservoirs from under the gel filtration pipette tip rather than moving the tips themselves. For example, after loading the sample into the gel, the solvent reservoir can be removed from under the gel filtration pipette tips and replaced with a collection well. Then a pipette tip can dispense the elution solvent onto the gel in the gel filtration pipette tip, and the elution solvent is either allowed to flow via gravity, or the pipetting head is attached, via the Tip-on-Tip format or with an adaptor, to the gel filtration pipette tip and the elution solvent is pushed through the gel and collected in the well using positive pressure.

The collected target compounds can be analyzed by any method usually combined with gel filtration chromatography. The methods include at least one of refractive index detector, UV-Vis detector, viscometer, multi-angle light scattering detector, gel electrophoresis and/or mass spectrometer. In some embodiments, each of these detectors are in tandem to analyze a sample.

EXAMPLES

The following examples are included to demonstrate embodiments of the appended claims. Those of skill in the art should appreciate that many changes can be made in the specific embodiments which are disclosed and still obtain a like or similar result without departing from the spirit and scope of the disclosure herein. In no way should the following examples be read to limit, or to define, the scope of the appended claims.

Example 1

The separation capabilities of the presently described device was evaluated using size exclusion media with a low molecular weight cutoff of 1500 Da, using a hand-held pipettor as the pipetting aid. The sample solution contained a mixture of FD&C red 40 and red 3 dyes (small molecules with molecular weights of 496 and 880 g/mol, respectively), and a blue stained protein standard (molecular weights 10-250 kDa).

Figure 3:
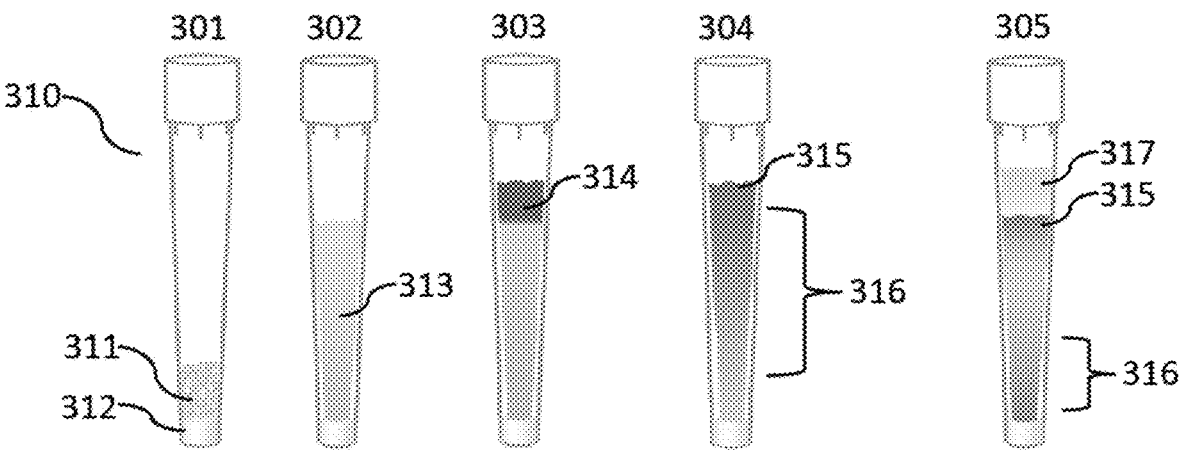
FIG. 3 illustrates the method of preparing and using a gel filtration pipette tip for separation of target compounds in a sample.
Figure 4:
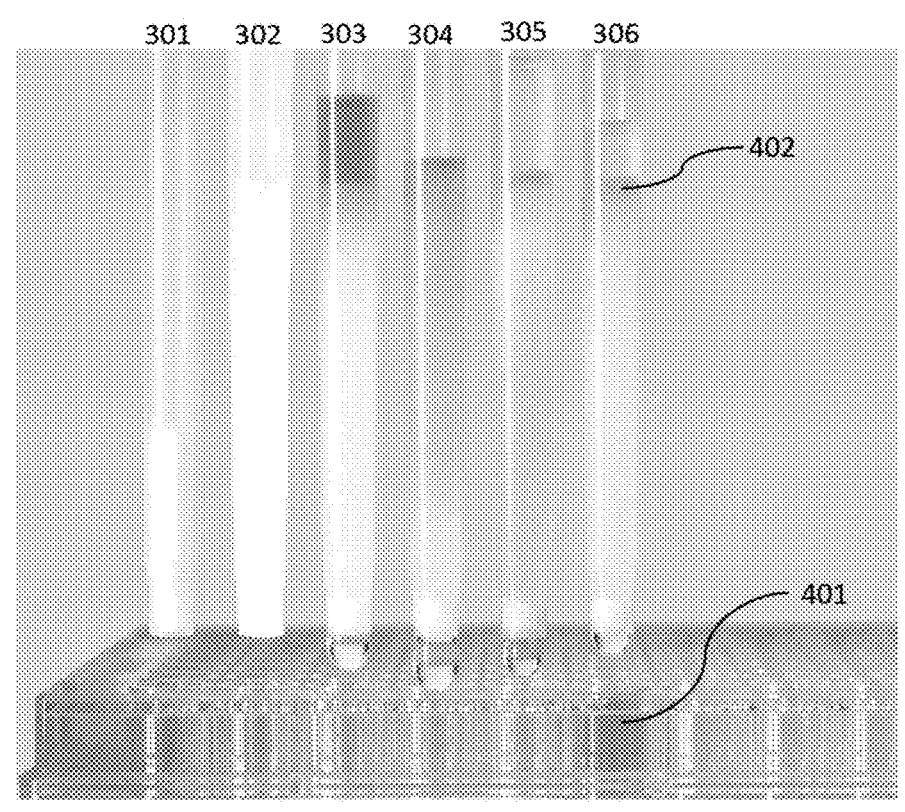
FIG. 4 is an image of gel filtration pipette tip at various points in the method illustrated in FIG. 3.

The process for preparing the gel filtration pipette tip and performing the separation is illustrated in FIG. 3 and real images of the gel filtration pipette tip at different points in this process are shown in FIG. 4; however, the sample wells and pipetting aids are not shown for simplicity.

The gel filtration pipette tip 310 utilized Sephadex G15 resin 311 having a molecular weight cutoff of 1500 Da. About 180 mg of the Sephadex G15 resin was placed in a gel filtration pipette tip having a porous frit (50 µm and made of polyethylene and polystyrene blend) 312 at the distal, narrow end of the pipette tip, as shown in step 301.

Once the resin was in place, the gel filtration pipette tip was positioned on a rack (not shown in FIG. 3) over a solvent reservoir containing phosphate buffered saline (PBS) solution. A hand-held pipettor engaged the gel filtration pipette tip, creating an air-tight seal between the head of the pipettor and the hub of the gel filtration pipette tip. Approximately 0.7 mL of the PBS solution was drawn through the distal end of the gel filtration pipette tip and aspirated through the resin. The PBS solution was held in the gel filtration pipette tip for about 10 minutes, allowing the resin to swell and settle. The gel filtration pipette tip was then ejected from the head of the pipettor and placed onto the rack to allow the PBS solution to drain via gravity flow into a waste solvent reservoir. This resulted in a homogenous gel filtration column 313 within the gel filtration pipette tip, as shown in Step 302. It is also possible to use positive pressure from the pipettor to push the PBS solution through the wetted material and out of the pipette tip to form the homogenous gel filtration column. Within a few minutes, the size exclusion gel was ready for use for protein separations.

A 0.2 mL aliquot of the sample solution 314 was pipetted slowly onto the top of the size exclusion gel, and loaded into the gel using gravity flow, per step 303. The smaller red dyes 315 are retained by the size exclusion gel and remain at the top while the larger proteins 316 begin to move through the gel column and separate from the red dyes, as shown in step 304. After loading the sample, the waste solvent reservoir was replaced with a sample vial. Then, 0.3 mL (300 µL) of the PBS solution 317 was added to the top of the gel, and passed through the gel using positive pressure from the handheld pipettor (not shown in FIG. 3). The smaller red dyes were retained by the size exclusion gel and remained at the top of the gel bed while the larger, blue stained proteins were able to exit the gel filtration pipette tip and be collected in the sample vial as these target compounds eluted from the gel.

FIG. 4 displays images of the gel filtration pipette tips at various points in this separation process, including step 306 collection of target compounds. The targeted compounds, blue stained proteins, are clearly visible in the sample vial 401, while the red dyes remain at the top 402.

Once collected, the separated target compounds can undergo further analysis using refractive index detector, UV-Vis detector, viscometer, multi-angle light scattering detector, gel electrophoresis and/or mass spectrometer if needed.

Example 2

This example describes the methods for using a robotic liquid handler and adaptors with the gel filtration pipette tip. As before, the sample solution contained a mixture of FD&C red 40 and red 3 dyes (small molecules with molecular weights of 496 and 880 g/mol, respectively), and a blue stained protein standard (molecular weights 10-250 kDa).

The gel filtration pipette tip for this example utilized Sephadex G25 resin, which has a molecular weight cutoff of 5000 Da. About 150 mg of the Sephadex G25 resin was placed in a 1 mL pipette tip having a porous frit at the distal, narrow end of the pipette tip. The gel filtration pipette tip was positioned on a rack over a solvent reservoir containing PBS solution on the deck of a Hamilton Nimbus96 robotic liquid handler.

The robotic liquid handler's pipetting head engaged the gel filtration pipette tip by first attaching to an adaptor fitted with an o-ring. Then the adaptor was placed on top of the hub of the gel filtration pipette tip and pressed down, forming an air-tight, yet reversible, seal between the adaptor and the gel filtration pipette tip. Then, 0.8 mL of the PBS solution was aspirated through the distal end of the gel filtration pipette tip into the tip. The PBS solution was held in the gel filtration pipette tip for about 10 minutes, allowing the Sephadex G25 resin to swell and settle. The o-ring adaptor on the gel filtration pipette tip was removed and ejected from the pipetting head. The PBS solution in the gel filtration pipette tip was then allowed to drain via gravity flow into the solvent reservoir, resulting in a homogenous gel filtration column in the gel filtration pipette. Within a few minutes, the gelled size exclusion media was ready for use for protein separations.

The liquid handler aspirated 0.25 mL of the sample solution into a standard robotic pipette tip and pipetted the sample solution onto the top of the gel in the gel filtration pipette tip. The height of the gel column will depend on the initial amount of dry resin used and the liquid handler can easily be programmed such that this standard robotic pipette tip does not touch the top of the gel. Once placed on the gel, the sample loads onto the top of the gel using gravity flow.

In the present example, after the sample was loaded onto the gel, an adaptor with a gasket was used to engage and move the gel filtration pipette tip. The adaptor was inserted into the gel filtration pipette tip, making an air-tight, yet irreversible, seal. This allowed the gel filtration pipette tip to be picked up and moved onto a rack position placed over a collection well. By using the adaptor, the pipetting head cannot become contaminated with the sample solution.

After, the pipetting head of the RLH disengaged the adaptor, it picked up a 50 μL standard pipette tip and aspirated 50 μL PBS buffer. The solvent was accurately delivered through the adaptor onto the top of the gel. This step of delivering PBS buffer was repeated 5 times for a total of 300 μL of elution solvent. The elution solvent was allowed to flow via gravity through the gel. As in Example 1, the smaller red dyes stayed at the top of the gel bed, and the blue stained proteins were collected in the well plate as these target compounds were eluted from the gel. Once collected, the separated target compounds can undergo further analysis using refractive index detector, UV-Vis detector, viscometer, multi-angle light scattering detector, gel electrophoresis and/or mass spectrometer if needed.

While this example utilized an adaptor to indirectly engage the gel filtration pipette tip, a pipette tip having an o-ring or gasket on its outer surface could have been used in much the same way as adaptor. Here, the pipette tip and the gel filtration pipette tip would be in a Tip-on-Tip format. A benefit of using the Tip-on-Tip format or the adaptor is that the pipetting head of the robotic liquid handler never interacts directly with the gel filtration pipette tip after it has been loaded with a sample. Instead, it engages the gel filtration pipette tip with the "top" pipette tip or adaptor. This reduces the risk of cross-contaminating samples via the pipetting head.

Example 3

In addition to gel filtration, the presently described devices can also be used for group separations, such as desalting. In this example, gel filtration pipette tips were prepared and evaluated for their use in rapid desalting for protein analysis.

In this example, 300 μL wide bore pipette tips were fitted with a 50 μm porosity frit at the distal end. Resin was then added to each tip to form the gel filtration pipette tips. The tips contained either 45 mg of Sephadex G15 resin, or 31 mg Sephadex G25fine resin.

As before, the gel filtration pipette tips were placed in a buffer reservoir, and a hand-held pipettor was used to slowly aspirate 300 μL of PBS buffer into the gel filtration pipette tips, which was held therein to swell the resin and allow to settle. This amount of buffer was able to be used because the maximal volume of these tips is actually 350 μL, not the listed volume of 300 μL.

After a predetermined amount of time, here 10 minutes, the pipettor was detached from the gel filtration pipette tips and the buffer was allowed to drain via gravity into a waste container, leaving a homogenous gel filtration column in the gel filtration pipette tips. After settling, the resin beds were about 1.5 cm in length in each gel filtration pipette tip.

A sample volume of 50 μL containing 4 mM Tartrazine, a dye used to indicate small molecules, was loaded onto the gel and allowed to gravity flow. Then, 60 μL of the PBS buffer was added to the top of the gel as an elution solvent and allowed to elute the sample by gravity flow. No Tartrazine was detected in the elution solvents, indicating that the small molecules and hence "salts" were removed from the solutions. Further, Tartrazine was visible in the resin bed only, indicating these small molecules were trapped by size exclusion. Had this been a real sample having proteins, then the collected elution solvent would have been ready for further analysis.

Thus, all three methods show that the presently described methods allow for the rapid, robust, and reproducible production of a gel that can be used for gel filtration separations, including group separations and high resolution fractionation. Further, the methods in Examples 1 and 2 were able to quickly and efficiently produce a size exclusion media gel from the dry media using either a handheld pipettor or a RLH platform. Once the size exclusion media swells into a gel, samples having two or more analytes of differing sizes could be separated using gel filtration methods. Once separated, the compounds can then undergo further analysis.

The following references are incorporated by reference in their entirety.

US20090223893A1

WO20180268886

The invention claimed is:

1. A method of preparing a gel filtration pipette tip, comprising:
   a) attaching a filtration pipette tip having a hub at a proximal end to a pipetting aid, wherein said filtration pipette tip has a filter located at a distal delivery end and a dry size exclusion media above said filter and below said hub attached to said pipetting aid;
   b) aspirating a solvent through said distal delivery end of said filtration pipette tip;
   c) equilibrating said dry size exclusion media and said solvent to form a wetted size exclusion media in said filtration pipette tip; and
   d) draining the excess solvent through said distal delivery end of said filtration pipette tip to form a gel filtration pipette tip, wherein said wetted size exclusion media settles during said draining and forms a homogenous gel filtration column.

2. The method of claim 1, wherein said pipetting aid is a hand-held pipettor, a syringe, or a robotic liquid handler that directly attaches to said filtration pipette tip or indirectly attaches thereto through the use of an adaptor or a top pipette tip.

3. The method of claim 1, wherein said attaching, aspirating, equilibrating, removing, and draining steps are performed on a robotic liquid handling platform by a robotic liquid handler.

4. The method of claim 1, wherein said filter is a screen or porous frit comprising stainless steel, porous polymeric material, porous glass, or porous ceramic.

5. The method of claim 1, wherein said dry size exclusion media comprises agarose, sepharose, polyacrylamide, dextran, dextran crosslinked with epichlorohydrin, polystyrene, polyacrylate, cellulose, or a combination thereof.

6. The method of claim 1, wherein said draining step comprises gravity flow or positive pressure.

7. The method of claim 1, wherein said filtration pipette tip has a barrier at or below said hub and said barrier is removed or pierced before use of said filtration pipette tip.

8. A method of gel filtration comprising:
   a) attaching a filtration pipette tip having a hub at a proximal end to a pipetting aid, wherein said filtration pipette tip has a filter located at a distal delivery end and a dry size exclusion media above said filter and below said hub, wherein said dry size exclusion media is loosely contained in said filtration pipette tip;
   b) aspirating a solvent through said distal delivery end of said filtration pipette tip using said pipetting aid;
   c) equilibrating said dry size exclusion media and said solvent in said filtration pipette tip to form a wetted size exclusion media;
   d) draining excess solvent through said distal delivery end of said filtration pipette tip to form a gel filtration pipette tip, wherein said wetted size exclusion media settles during said draining and forms a homogenous gel filtration column;

e) introducing a sample solution to a top of said homogenous gel filtration column in said gel filtration pipette tip, wherein said sample solution comprises two or more analytes of different sizes;

f) loading said sample solution into said homogenous gel filtration column;

g) adding an elution solvent to said top of said homogenous gel filtration column, h) flowing said elution solvent through said homogenous gel filtration column, wherein said homogenous gel filtration column separates said two or more analytes into two or more separated groups based on said different sizes; and, i) eluting each of said two or more separated groups into its own collection well.

9. The method of claim 8, further comprising a step of analyzing each of said two or more separated groups using refractive index detector, UV-Vis detector, viscometer, multi-angle light scattering detector, gel electrophoresis and/or mass spectrometer.

10. The method of claim 8, wherein said pipetting aid is a hand-held pipettor, a syringe, or a robotic liquid handler that directly attaches to said filtration pipette tip or gel filtration pipette tip, or indirectly attaches thereto through an adaptor or top pipette tip.

11. The method of claim 8, wherein said pipetting aid is a robotic liquid handler and steps 7*a* to 7*i*) are performed on a robotic liquid handling platform.

12. The method of claim 8, wherein said filter is a screen or porous frit comprising stainless steel, porous polymeric material, porous glass, or porous ceramic.

13. The method of claim 8, wherein said dry size exclusion media comprises agarose, sepharose, polyacrylamide, dextran, dextran crosslinked with epichlorohydrin, polystyrene, polyacrylate, cellulose, or a combination thereof.

\* \* \* \* \*